UNITED STATES PATENT OFFICE.

CLEMENS O. BRUECKNER, OF FORT WAYNE, INDIANA.

PROCESS OF PURIFYING WATER.

SPECIFICATION forming part of Letters Patent No. 692,979, dated February 11, 1902.

Application filed January 4, 1901. Serial No. 42,122. (No specimens.)

*To all whom it may concern:*

Be it known that I, CLEMENS O. BRUECKNER, a citizen of the United States, residing at Fort Wayne, in the county of Allen and State of Indiana, have invented new and useful Improvements in Processes of Purifying and Clarifying Water, of which the following is a specification.

This invention relates to a certain new and useful process for purifying and clarifying water, so that the same can be used for drinking purposes, but more particularly used for the generation of steam in boilers.

Water purified and clarified by my new and useful composition when used in steam-boilers will prevent the accumulation of scales upon the boiler-tubes, the foaming of the boiler, the engine from priming, and gage-glass from discoloring.

The water to be purified and clarified having been analyzed to ascertain its chemical properties, for example, would show by test twenty-five grains carbonic acid, twenty-eight grains of iron, and ten grains of sulfuric acid in five gallons of water. The water is agitated in a suitable tank, and I add thereto fifteen grains of soda-ash dissolved in boiling water to soften the water, then twenty-three grains of lime, preferably slaked, is added to the water to purify the same, and then finally incorporate seven grains of phosphate of soda for precipitating the various matters in the water, as well as clarifying the same, and preventing the boiler from foaming, the engine from priming, and, furthermore, removing the alkaline taste. The water is agitated while the soda-ash, lime, and phosphate of soda are incorporated, and also agitated ten to twenty minutes after the composition has been added. After the agitation the water will be clarified and the various matters precipitated in a short time, and no filtration is necessary. The water then can be used for drinking or employed in steam-boilers without any danger of the accumulation of scales, foaming of the boiler, or priming of the engine, and it is thought the many advantages of my new and useful composition for purifying and clarifying water can be readily understood from the foregoing description.

Having thus fully described my invention, what I claim as new, and desire to secure by Letters Patent, is—

1. The herein-described process for purifying and clarifying water, which consists in subjecting the water successively to soda-ash, lime and phosphate of soda in the proportions of fifteen grains of soda-ash, twenty-three grains of lime and seven grains of phosphate of soda to five gallons of water.

2. The herein-described process for purifying and clarifying water, which consists in subjecting the water while agitated successively in the proportions of fifteen grains of soda-ash dissolved in boiling water, twenty-three grains of slaked lime and seven grains of phosphate of soda to five gallons of water.

3. The herein-described process for purifying and clarifying water, which consists in subjecting the water successively to soda-ash dissolved in boiling water, lime and phosphate of soda in the proportions substantially as specified to five gallons of water.

In testimony whereof I have hereunto set my hand in presence of two subscribing witnesses.

CLEMENS O. BRUECKNER.

Witnesses:
OSWALD BRUECKNER,
E. JOHNSTON.